(12) United States Patent
Flückiger et al.

(10) Patent No.: US 7,191,886 B2
(45) Date of Patent: Mar. 20, 2007

(54) ACTUATING DRIVE WITH A WRAP SPRING ARRANGEMENT

(75) Inventors: Martin Flückiger, Schweinfurt (DE); Thomas Walter, Kolitzheim (DE); Matthias Mülier, Röthlein (DE); Peter Fenn, Waigolshausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 110 days.

(21) Appl. No.: 10/998,371

(22) Filed: Nov. 29, 2004

(65) Prior Publication Data

US 2005/0115793 A1    Jun. 2, 2005

(30) Foreign Application Priority Data

Nov. 28, 2003  (DE) ............................... 103 55 721

(51) Int. Cl.
*F16D 41/20* (2006.01)

(52) U.S. Cl. ................................. 192/223.4
(58) Field of Classification Search ............ 192/223.4, 192/17 D
See application file for complete search history.

(56) References Cited

U.S. PATENT DOCUMENTS 1,687,243 A * 10/1928 Haskins .................. 192/223.4
1,965,878 A * 7/1934 Briggs .................... 192/223.4
2,145,666 A * 1/1939 Roethel ................... 192/223.3
2,598,993 A * 6/1952 Gorske .................... 192/223.4
3,235,248 A * 2/1966 Hans ........................ 74/89.18
3,930,566 A * 1/1976 Matsushima ............ 192/223.4
4,499,787 A * 2/1985 Leistner et al. ............... 74/625
4,871,033 A * 10/1989 Odoni et al. ............... 192/17 D

OTHER PUBLICATIONS

"Schlingfedern: interessante mechanische Servoelemente", *Antriebstechnik*, vol. 34, No. 11, 1995, p. 67.

* cited by examiner

*Primary Examiner*—Rodney H. Bonck
(74) *Attorney, Agent, or Firm*—Cohen Pontani Lieberman & Pavane LLP (57) ABSTRACT

An actuating drive for transmitting drive torque to a power takeoff, comprising a drive unit; a braking device comprising a cylindrical surface; and a wrap spring having a plurality of turns which are concentric to the cylindrical surface, a pair of ends, a first actuating area on one of the ends, and a second actuating area on one of the ends. When the drive unit exerts a drive torque in a first direction, the first actuating area is nonrotatably connected to the drive unit, the turns undergo a diameter change away from the cylindrical surface, and the second actuating area is nonrotatably connected to the power takeoff for transmitting drive torque. When the drive torque is interrupted, the turns undergo a diameter change toward the cylindrical surface and frictionally engage the cylindrical surface to block transmission of restoring torque from the power takeoff to the drive unit.

16 Claims, 5 Drawing Sheets

ACTUATING DRIVE WITH A WRAP SPRING ARRANGEMENT

BACKGROUND OF THE INVENTION

1. Field of the Invention

The invention pertains to an actuating drive which is in working connection with a power takeoff by way of a wrap spring arrangement with a plurality of turns between two ends which serves as a load torque interlock.

2. Description of the Related Art

A technical article which deals with wrap springs as mechanical servo elements was published in the technical journal *Antriebstechnik*, Vol. 34, No. 11, 1995, beginning on page 67. Special designs of wrap spring arrangements are discussed in Section 2.3 of this article. These special designs can be used to produce a load torque interlock.

Although the basic function and design of wrap spring arrangements are described in this article, there is no concrete description in which a special design acting as a load torque interlock is discussed by way of example.

SUMMARY OF THE INVENTION

The invention has the task of designing an actuating drive with a wrap spring arrangement serving as a load torque interlock in such a way that, with the least possible effort, a precise holding function for a power takeoff can be ensured even when the wrap spring arrangement is not absorbing any torque from the drive.

According to the invention, advantage is taken of a certain property of wrap spring arrangements, which makes it possible to obtain a specific reduction ratio between the two ends of the spring by selecting the appropriate the number of turns of the wrap spring. When the number of turns is relatively large, only a negligibly small residual torque will be present at the power takeoff end of the spring even if a strong drive torque is being introduced into the end of the spring in working connection with the drive. This residual torque, however, does not necessarily have to be absorbed at the takeoff end of the spring. It is also possible according to the invention for some or all of the torque of the wrap spring to be absorbed around the circumference of the turns. For this reason, the wrap spring is installed in the actuating drive in such a way that the turns of the wrap spring can enter into frictional contact with a radially adjacent braking device, so that the drive torque introduced at the drive end of the turns can be absorbed by the preferably stationary braking device. In this design, the takeoff end of the turns of the wrap spring can remain completely unsupported.

According to the invention, each end of the turns of the wrap spring has a first actuating area assigned to a selected direction of rotation and a second actuating area assigned to the opposite direction of rotation. Of these two actuating areas at one end of the turns, the first is in working connection with the drive so that the drive torque can be introduced, the drive consisting of, for example, an electric motor, whereas the second actuating area at the end of the turns can be brought into working connection with the power takeoff. The power takeoff can be formed by a clutch device preceded by a gearbox, so that the second actuating area of the end of the turns is accordingly in working connection with the input part of the gearbox.

When a drive torque is introduced to the first actuating area of the adjacent end of the turns, for example by the motor shaft of the electric motor, the end of the turns is carried along as well—under the assumption of a certain rotational position of the shaft—and thus, because the power takeoff is in working connection with the second actuating area of the end of the turns, the power takeoff is carried along also. As soon as the motor shaft of the drive introduces the drive torque into the first actuating area of the corresponding end of the turns, the diameter of the turns of the wrap spring is changed, this change in diameter occurring in the direction pointing radially away from the braking device. As a result, the frictional connection between the turns of the wrap spring and the braking device is at least weakened, so that the drive is required to overcome only a limited amount of frictional resistance during the further course of its actuating movement.

As soon as the actuating process is over, the drive is turned off by shutting off the supply of current to the electric motor, for example. As a result, the actuating area of the end of the wrap spring assigned to the drive moves the drive, e.g., the motor shaft of the electric motor, back in the direction opposite the previous direction of rotation by a certain minimum angular distance, which is accompanied by a slight reduction in the pretension of the spring. As a result, the diameter of the turns of the wrap spring changes slightly in the radial direction toward the braking device. At the same time, a torque, referred to in the following as the restoring torque, which also acts in the direction opposite that of the previous direction of rotation, is applied by the power takeoff to the end of the spring adjacent to the power takeoff and thus to the second actuating area. As a result, a change in diameter is again produced in the turns of the wrap spring in the radial direction toward the braking device, this restoring torque originating from the power takeoff being sufficiently strong to expand the turns of the wrap spring to such an extent that they enter into frictional connection with the braking device with a high applied force. The wrap spring is now in a position in which the wrap spring arrangement is self-locking; any further movement of the actuating drive under the action of the restoring torque can to this extent be effectively prevented. As a result, the special advantage is obtained that the drive is turned on only for the actuating process itself, and if the drive is designed as an electric motor, it must be supplied with power for only short periods of time. The drive itself does not need to be in operation over the course of long holding times at the power takeoff, such as when the clutch device is engaged.

So that the power takeoff can be returned to its original position to disengage the clutch device, for example, the drive is made to rotate in the opposite direction and thus to act now on the previously torque-free end of the wrap spring, namely, on its first actuating area assigned to the drive. Thus the diameter of the wrap spring is again caused to change slightly in the direction away from the braking device, thus coming at least partially away from the braking device, until the power takeoff has resumed its original position.

Because both ends of the wrap spring have first and second actuating areas, the actuating movement can be realized regardless of the direction of rotation initially selected for the drive.

So that the drive torque can be transmitted by the drive to the adjacent end of the wrap spring turns, the drive is provided with a first control element for the first actuating area of the end of the turns, and the power takeoff is provided with a second control element for the second actuating area of the end of the turns. The first control element can be provided, for example, on the motor shaft of the drive, or, in accordance with an advantageous elaboration, it can be provided on a sleeve attached nonrotatably to the motor shaft. Similarly, the second control element on the power takeoff can be provided, for example, on an input element of the gearbox of the clutch device, or, in accordance with an advantageous elaboration, on a sleeve attached nonrotatably to the input part.

When the wrap spring arrangement is designed with the two sleeves, the drive torque is transmitted via the sleeves to the power takeoff. According to the invention, each of these sleeves has an axial projection, which extends a predetermined angular distance around the circumference. The circumferential ends of the axial projection provide the control elements for the associated end of the wrap spring turns.

The two sleeves are preferably coaxial to each other, and their axial projections preferably engage in corresponding openings in the other sleeve. In the circumferential direction, sufficient free spaces remain between two axial projections to accommodate the ends of the wrap spring turns. When designed in this way, the two sleeves also provide a reciprocal locking function in the axial direction, so that they can be pushed toward each other only up to a predetermined extent. After they have been positioned in this way, the two sleeves are then, in an advantageous embodiment, enclosed by the turns of the wrap spring, which for their own part are located radially inside the braking device, the latter being preferably designed as an essentially ring-shaped shell, mounted nonrotatably on a housing.

So that the wrap spring can be effectively prevented from being inserted into the two sleeves in a laterally reversed manner, the sleeves have blocking elements for this purpose, so that production problems arising from human error will not occur.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
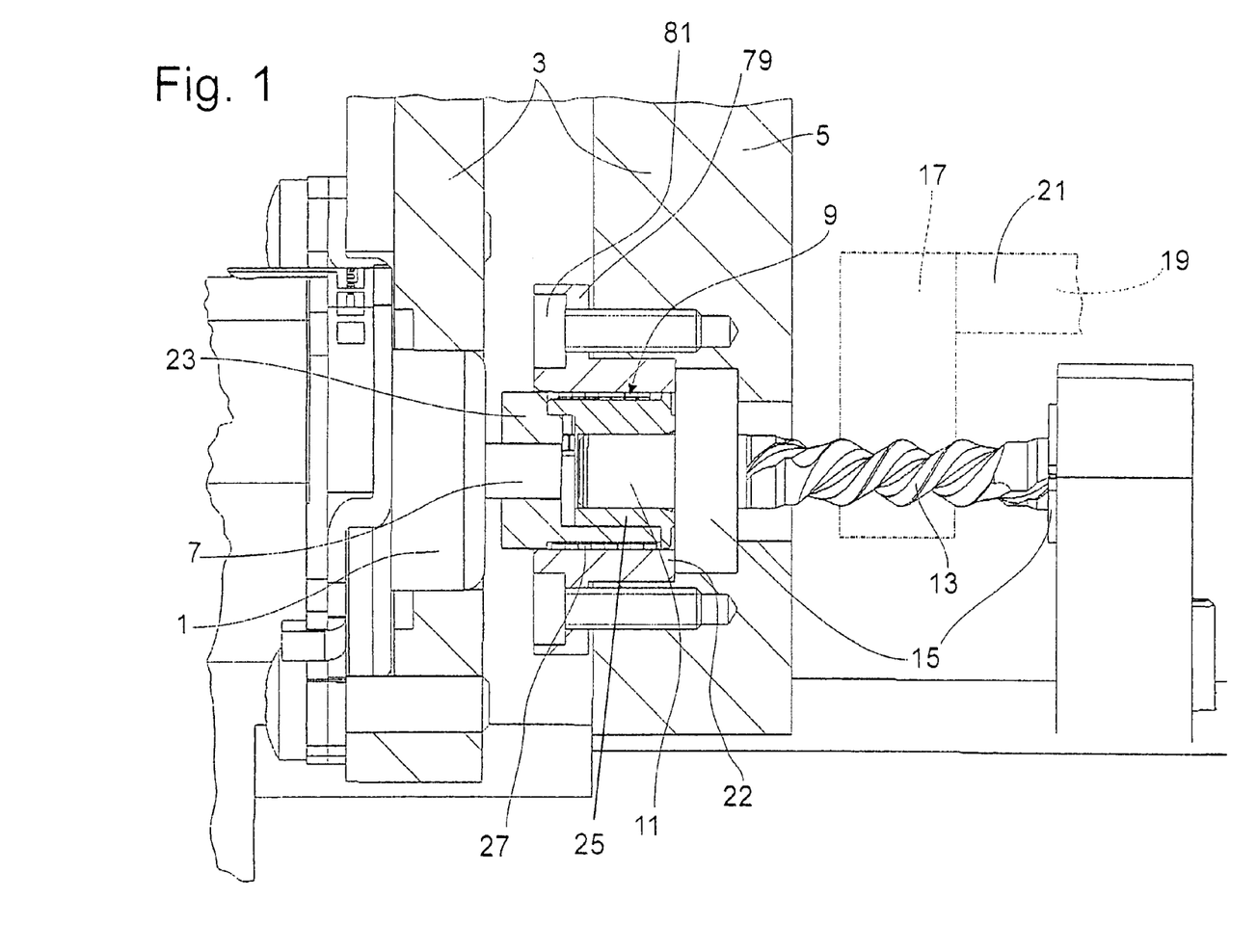
FIG. 1 shows a cross section through an actuating drive with a drive unit; a wrap spring arrangement with two sleeves and a wrap spring; and a power takeoff.

FIG. 1 show a drive 1 with a wrap spring arrangement 9 and a power takeoff 21, which are mounted in brackets 3 of a housing 5. The drive 1 can be realized in the form of an electric motor with a motor shaft 7, on which a first sleeve 23 is mounted nonrotatably in a manner not shown. This sleeve cooperates by way of a wrap spring 27 with a second sleeve 25, which is mounted nonrotatably on a journal 11 of an input part 13 of a gearbox 17. The gearbox 17 and a clutch device 19 together form the previously mentioned power takeoff 21, whereas the sleeves 23 and 25 together with the wrap spring 27 constitute the wrap spring arrangement 9. In a manner to be described in greater detail below, the wrap spring 27 cooperates with a braking device 22, which radially surrounds the wrap spring arrangement 9. The braking device is designed as an essentially ring-shaped shell 79 and is permanently connected to a bracket 3 of the housing 5 by fastening means 81.

Figure 2:
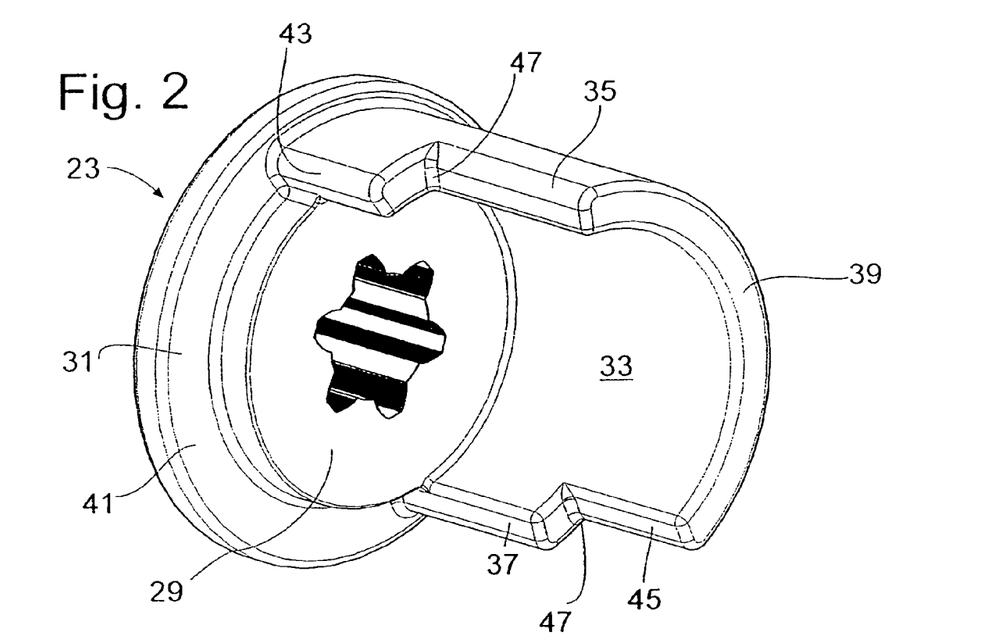
FIG. 2 shows an enlarged, partial, perspective view of the drive-side sleeve.
Figure 3:
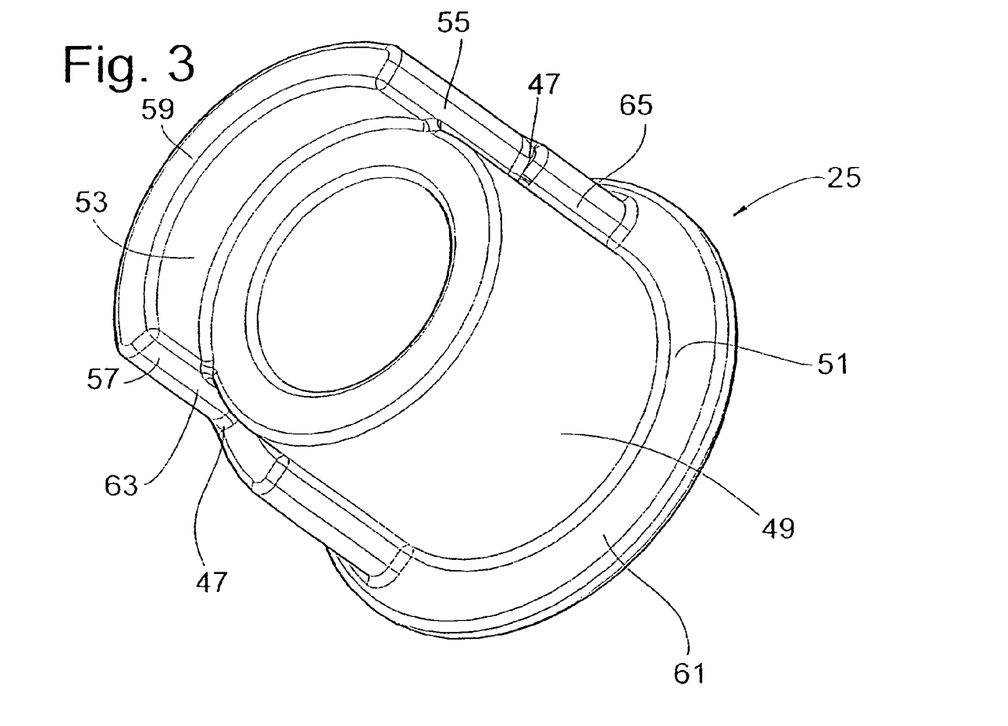
FIG. 3 shows an enlarged, partial, perspective view of the takeoff side sleeve.

FIG. 2 shows a first sleeve 23 by itself, and FIG. 3 shows the second sleeve 25 by itself. The first sleeve 23 has a cylindrical base part 29, from which a radial collar 31 extends radially outward. This radial collar 31 supports an axial projection 33, which extends around a predetermined portion of the circumference of the base part and has control elements 43, 45 along parts of its two circumferential ends, i.e., the ends 35 and 37. These control elements cooperate with first actuating areas 73, 74 (FIG. 4), formed by the ends 69, 71 of the turns 67 of the wrap spring 27, these ends following after bent sections 89, 91.

Figure 4:
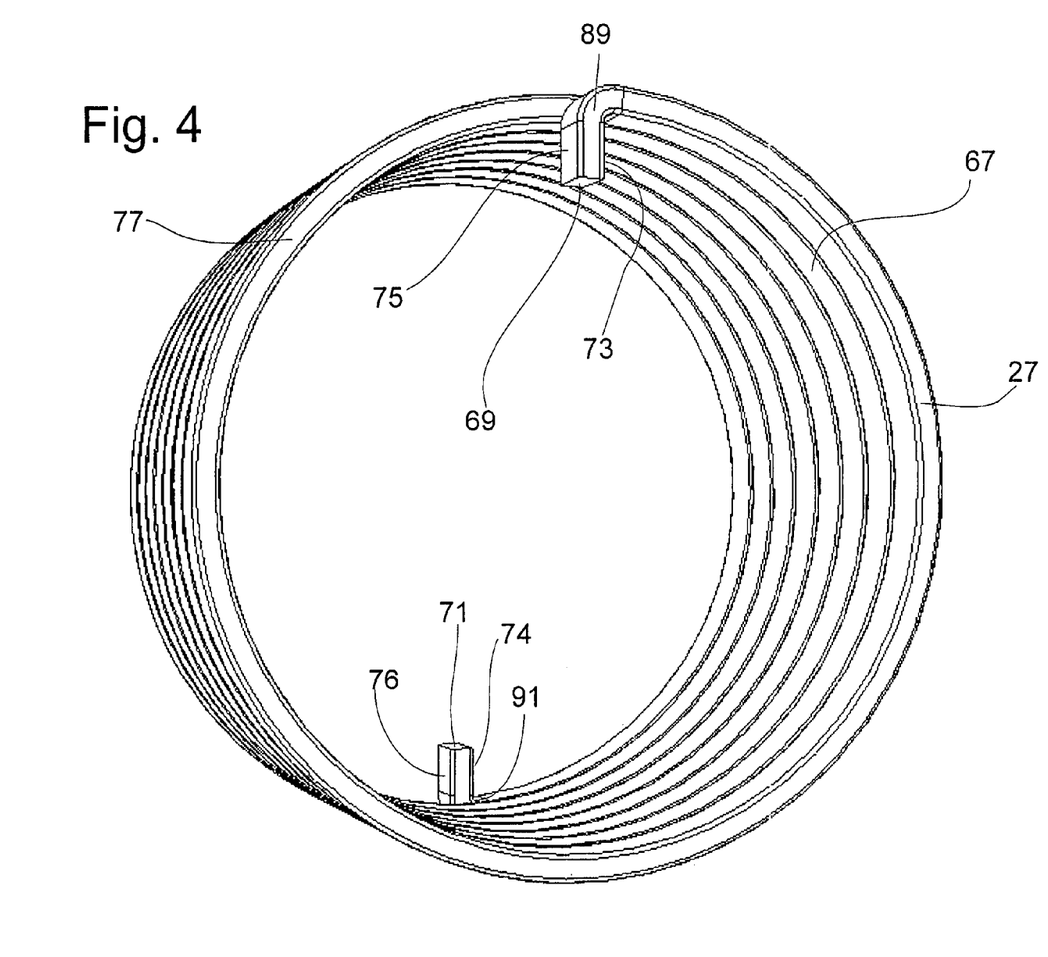
FIG. 4 shows an enlarged, partial, perspective view of the wrap spring.

The second sleeve 25, shown in FIG. 3, also has a cylindrical base part 49, from which a radial collar 51 extends radially outward. The collar supports an axial projection 53, which extends a certain distance around the circumference of the base part and has control elements 63, 65 along parts of its circumferential ends 55, 57. These control elements can be brought into working connection with the second actuating areas 75, 76 on the ends 69, 71 of the turns 67 of the wrap spring 27 (FIG. 4).

Figure 5:
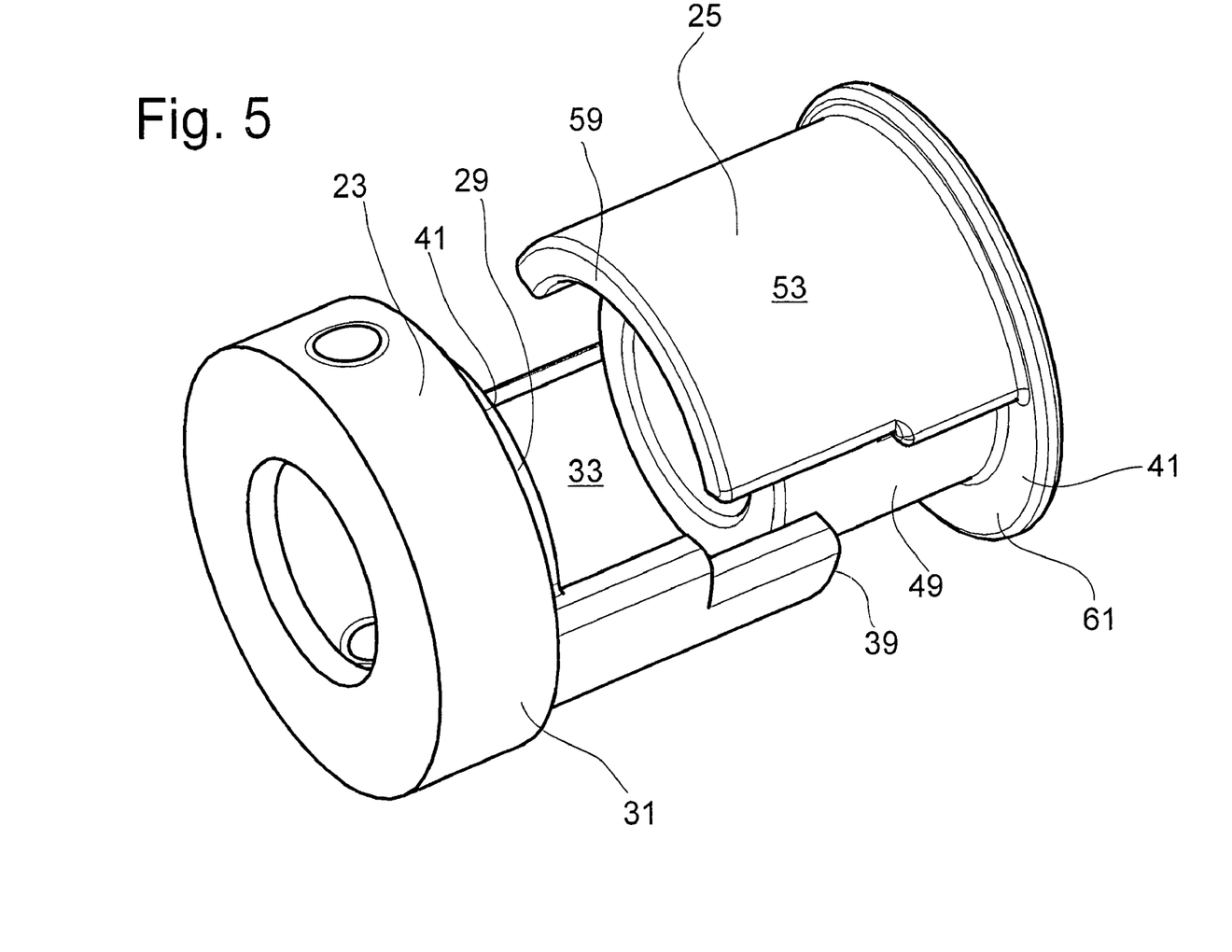
FIG. 5 shows an exploded view of the two sleeves as they are being assembled.
Figure 6:
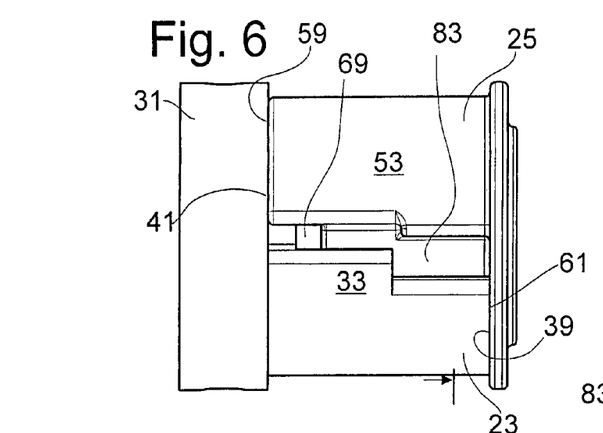
FIG. 6 shows a side view of the two sleeves after they have been assembled.
Figure 7:
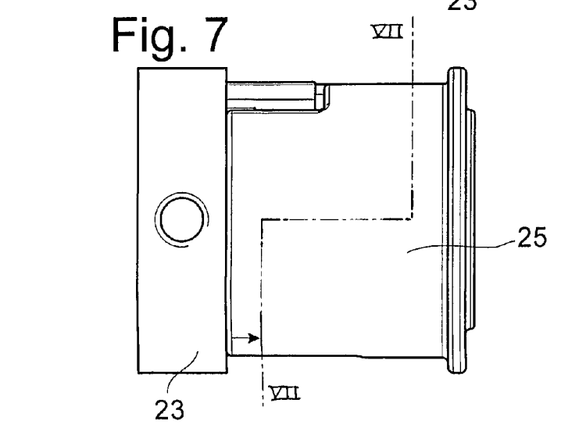
FIG. 7 is similar to FIG. 6, except that it has been rotated 90° and shows the location of the cross-sectional line VII—VII.

As FIG. 1 and especially as FIG. 5 shows, the two sleeves 23 and 25 are pushed together coaxially. Each of the axial projections 33 and 53 extends over a distance of less than 180° in the circumferential direction, so that neither of the two axial projections 33, 35 interferes with the other as the two sleeves 23, 25 approach each other in the axial direction. The open spaces 83, 85, which are shown in FIG. 6 (free space 83 only) and in FIG. 8, remain circumferentially between the two axial projections 33, 53. As is especially clear in FIG. 8, the free spaces 83 and 85 not only serve to accept the ends 69, 71 of the turns 67 of the wrap spring 27, but also give the two sleeves 23, 25 the possibility of moving relative to each other in the circumferential direction to a certain limited extent, so that a change in the diameter of the turns 67 of the wrap spring 27 can be achieved by producing a change in the relative rotational position of the two sleeves 23, 25. This point will be described in greater detail at a later point in the specification.

To return to FIG. 2, this shows a free axial end 39 on the axial projection 33; after the sleeves 23 and 25 have been pushed together, this free end cooperates with an axial stop 61 on the radial collar 51 of the second sleeve 25, shown in FIG. 3. The second sleeve 25 also has a free axial end 59 on its axial projection 53; this free end can be brought into contact with the axial stop 41 of the radial collar 31 of the first sleeve 23, shown in FIG. 2. In FIG. 6, the two sleeves 23, 25 are completely pushed together, and thus the axial stops 41, 61 are shown in their actively functioning positions.

It should be mentioned that FIGS. 2 and 3 also show blocking elements 47, which, because of their geometric form, allow the ends 69, 71 of the wrap spring 27 to be inserted in only one exactly defined position, whereas insertion in the reversed position, whether because of human error or production problems, is effectively prevented.

To return to FIG. 1, the wrap spring 27 with its turns 67 at a certain diameter is placed around the sleeves 23, 25; this diameter is such that the radially outer side of the turns 67 makes friction-locking contact with the radially inner surface of the braking device 22. As a result, the wrap spring arrangement 9 is locked in position.

Figure 8:
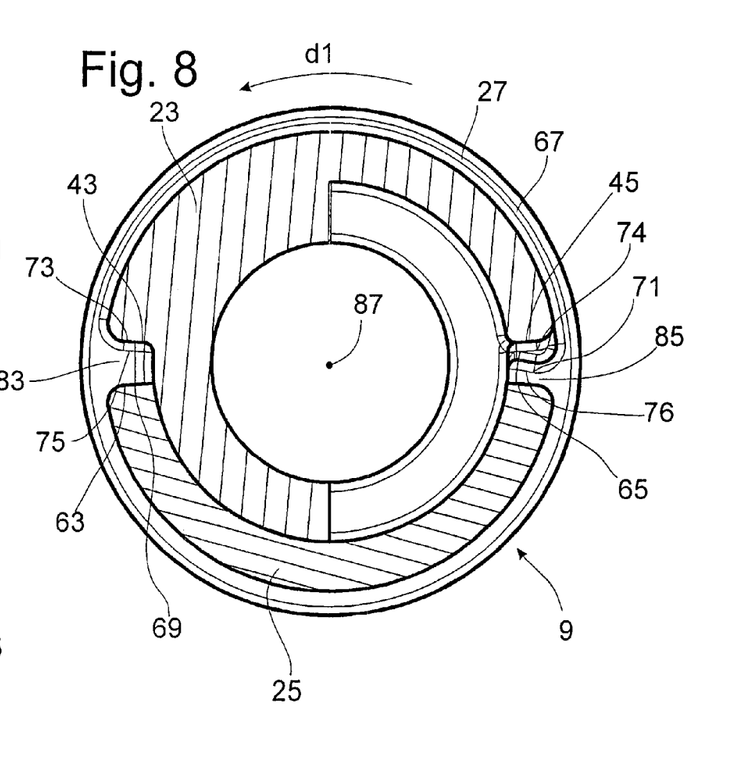
FIG. 8 shows a cross section through the assembled sleeves along line VII—VII of FIG. 7.

In a system in which the drive 1 is implemented in the form of an electric motor, the supply of current to the motor results in the rotation of the motor shaft 7 in a selected direction of rotation, as a result of which the first sleeve 23 is carried along in the same direction. This first direction of rotation is indicated in FIG. 8 by the directional arrow d1. When the first sleeve 23 is rotating in this direction around the common center axis 87, the control element 43 of the first sleeve 23 moves in direction of the rotation d1 and thus produces a defined pretension in the wrap spring 27, the turns 67 of which are still in friction-locking connection with the braking device 22; this pretension leads to a change in the diameter of the turns 67 in the radial direction away from the braking device 22, that is, radially inward, and thus at least weakens the friction-locking connection between the wrap spring 27 and the braking device. The further rotational movement of the first sleeve 23 in the direction of rotation d1 can therefore proceed with very little resistance.

After a movement phase in which, to achieve this change of diameter, the first sleeve 23 was moved alone in the direction of rotation d1, the free space 83 between the control element 43 of the first sleeve 23 and the control element 63 of the second sleeve 25 is used up, so that now the sleeve 23 drives the sleeve 25 in the direction of rotation d1 by way of the end 69 of the turns. The movement in this case is transmitted by the control element 43 of the first sleeve 23 to the first actuating area 73 of the end 69 of the turns and from its second actuating area 75 to the control element 63 of the second sleeve 25. The actuating movement can comprise a plurality of rotations of the sleeves 23, 25 in the direction of rotation d1 around the center axis 87, where the sleeve 25 transmits the rotational movement to the journal 11 of the input part 13 of the gearbox 17, which journal is connected nonrotatably to the sleeve 25. As soon as the clutch device 19, actuated by the gearbox 17, has arrived in a defined end position, e.g., its engaged position, the current to the drive unit 1 is shut off, whereupon its motor shaft 7 comes to a stop and no more drive torque is transmitted to the first sleeve 23. The previously pretensioned wrap spring 27 is able at this point to relax slightly and brings about in this way a slight reverse rotational movement of the motor shaft 7 and of the first sleeve 23. Simply as a result of this, there is a slight change in the diameter of the turns 67 of the wrap spring 27; that is, the turns 67 expand slightly in the radial direction. A torque acting on the second sleeve 25, however, referred to in the following as the "restoring torque", which attempts to move the engaged clutch device 19 back into its starting position, acts much more strongly. This restoring torque produced by the clutch device 19 is transmitted via the gearbox 17 with the input part 13, the journal 11, and the second sleeve 25 via its control element 63 to the second actuating area 75 of the end 69 of the wrap spring 27, as a result of which the second sleeve 25 is moved back by a limited angular distance opposite the direction of rotation d1. As this occurs, the turns 67 of the wrap spring 27 change their diameter in the direction toward the braking device 22, that is, radially outward, so that the turns 67 press more strongly in the radial direction against the inside surface of the braking device 22. As soon as a certain restoring distance in the direction opposite the direction of rotation d1 has been achieved, the frictional connection between the turns 67 and the braking device 22 is so high that the restoring torque coming from the power takeoff 21 is no longer able force any further restoring movement. The wrap spring arrangement 9 has now achieved a self-locking state, which has the effect of maintaining the clutch device 19 in its set position.

To disengage the clutch device 19, the drive unit 1 is supplied with current in such a way that its motor shaft 7 is driven in the direction of rotation opposite d1. Now the control element 45 of the first sleeve 23 comes to rest against the first actuating area 74 of the second end 71 of the turns and in the course of its further movement tensions the wrap spring 27 slightly, so that its turns 67 undergo a change of diameter in the direction away from the braking device 22, that is, radially inward, with the result that the previously mentioned self-locking state is released. Under the action of the restoring torque of the power takeoff 21, the second sleeve 25 can now execute a rotational movement opposite the direction of rotation d1. To ensure that the actuating drive returns as smoothly as possible to its starting position and thus to ensure that the clutch device 19 is restored as smoothly as possible to its starting position, the drive 1 is then actuated in such a way that, until this starting position is reached, a torque equilibrium is maintained between the drive torque provided by the drive 1, the braking torque produced by the residual frictional connection between the turns 67 of the wrap spring 27 and the braking device 22, and the restoring torque of the power takeoff 21. The drive 1 is then shut off.

It is easy to see that, because of the symmetry of the wrap spring arrangement 9, the clutch device 19 could also arrive in the engaged position when the direction opposite d1 were to be chosen as the initially selected direction of rotation, in which case the return movement of the clutch device to its disengaged position would occur in the direction of rotation d1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An actuating drive for transmitting drive torque to a power takeoff, said actuating drive comprising:
   a drive unit;
   a braking device comprising a cylindrical surface; and
   a wrap spring comprising a plurality of turns which are concentric to said cylindrical surface, a pair of ends, a first actuating area on each of said ends, and a second actuating area on each of said ends,
   wherein, when said drive unit exerts a first drive torque in a first direction, the first actuating area of one of said ends is nonrotatably connected to said drive unit, the turns undergo a diameter change away from the cylindrical surface, and the second actuating area of the one of said ends is nonrotatably connected to the power takeoff for transmitting drive torque,
   wherein, when said first drive torque from said drive unit is interrupted, the turns undergo a diameter change toward the cylindrical surface and frictionally engage the cylindrical surface to block transmission of restoring torque from the power takeoff to said drive unit, and
   wherein, when said drive unit exerts a second drive torque in a second direction which is opposite to the first direction, the first actuating area of the other of said ends being nonrotatably connected to said drive unit so that said second drive torque and said restoring torque acting in the same direction so that torque is exerted on both ends of said wrap spring simultaneously.

2. The actuating drive of claim 1, wherein the application of torque at one end of said wrap spring exerts essentially no torque at the other end of said wrap spring.

3. The actuating drive of claim 1, wherein the drive unit comprises a motor shaft and the takeoff comprises a clutch device having a gearbox with an input part, said drive unit further comprising:
   a first control element fixed nonrotatably to the motor shaft and cooperating with the first actuating area, and
   a second control element fixed nonrotatably to the input part and cooperating with the second actuating area.

4. The actuating drive of claim 3, further comprising:
   a first sleeve fixed nonrotatably to the motor shaft, said first control element being formed by said first sleeve; and
   a second sleeve fixed nonrotatably to the input part, said second control element being formed by said second sleeve.

5. The actuating drive of claim 4, wherein each of said sleeves comprises an essentially cylindrical base part, an axial projection extending from the base part, and a circumferential edge on the axial projection, said first and second control elements being formed on respective circumferential edges.

6. The actuating drive of claim 4, wherein said sleeves are coaxial, each of said axial projections extending circumferentially through a predetermined angle, one of said sleeves having an angular area where there is no axial projection, the axial projection of the other of said sleeves extending axially into said angular area.

7. The actuating drive of claim 5, wherein one of said sleeves has an axial stop and the axial projection of the other of said sleeves has a distal end which abuts the axial stop to limit relative axial movement of the sleeves.

8. The actuating drive of claim 7, wherein said one of said sleeves comprises a radial collar projecting radially from the base part, the axial stop being formed by the radial collar.

9. The actuating drive of claim 4, wherein the turns of the wrap spring surround the sleeves and lie radially inside the cylindrical surface of the braking device.

10. The actuating drive of claim 1, wherein said braking device is a ring-shaped shell having a radially inner surface which forms said cylindrical surface.

11. The actuating drive of claim 1, wherein said cylindrical surface is a radially inner surface surrounding said turns of said wrap spring,
   wherein an application of drive torque by said drive unit causes a reduction in the diameter of said turns, and
   wherein an interruption in drive torque from said drive unit allows the restoring torque of said power takeoff to increase the diameter of said turns so that said turns frictionally engage said radially inner surface of said braking device.

12. The actuating drive of claim 1, wherein said wrap spring has a radially extending bent section at least one of said ends.

13. An actuating drive for transmitting drive torque to a power takeoff, said actuating drive comprising:
   a drive unit;
   a braking device comprising a cylindrical surface; and
   a wrap spring comprising a plurality of turns which are concentric to said cylindrical surface, a pair of ends, a first actuating area on one of said ends, and a second actuating area on one of said ends,
   wherein, when said drive unit exerts a drive torque in a first direction, said first actuating area is nonrotatably connected to said drive unit, the turns undergo a diameter change away from the cylindrical surface, and the second actuating area is nonrotatably connected to the power takeoff for transmitting drive torque,
   wherein, when said drive torque from said drive unit is interrupted, the turns undergo a diameter change toward the cylindrical surface and frictionally engage the cylindrical surface to block transmission of restoring torque from the power takeoff to said drive unit, and
   wherein the drive unit comprises a motor shaft and the takeoff comprises a clutch device having a gearbox with an input part, said drive unit further comprising:
      a first control element fixed nonrotatably to the motor shaft and cooperating with the first actuating area; and
      a second control element fixed nonrotatably to the input part and cooperating with the second actuating area;
   said actuating drive further comprising:
      a first sleeve fixed nonrotatably to the motor shaft, said first control element being formed by said first sleeve; and
      a second sleeve fixed nonrotatably to the input part, said second control element being formed by said second sleeve.
   wherein at least one of said sleeves comprises a blocking element which prevents said wrap spring from being installed in an axially reversed position.

14. The actuating drive of claim 13, wherein said first and second actuating areas are provided on the same end of the wrap spring, said drive torque and said restoring torque acting in opposite directions.

15. An actuating drive for transmitting drive torque to a power takeoff, said actuating drive comprising:
   a drive unit;
   a braking device comprising a cylindrical surface; and
   a wrap spring comprising a plurality of turns which are concentric to said cylindrical surface, a pair of first actuating area on one of said ends, and a second actuating area on one of said ends, wherein, when said drive unit exerts a drive torque in a first direction, said first actuating area is nonrotatably connected to said drive unit, the turns undergo a diameter change away from the cylindrical surface, and the second actuating area is nonrotatably connected to the power takeoff for transmitting drive torque, wherein, when said drive torque from said drive unit is interrupted, the turns undergo a diameter change toward the cylindrical surface and frictionally engage the cylindrical surface to block transmission of restoring torque from the power takeoff to said drive unit, and wherein the drive unit comprises a motor shaft and the takeoff comprises a clutch device having a gearbox with an input part, said drive unit further comprising:
  a first control element fixed nonrotatably to the motor shaft and cooperating with the first actuating area; and
  a second control element fixed nonrotatably to the input part and cooperating with the second actuating area;

said actuating drive further comprising:
  a first sleeve fixed nonrotatably to the motor shaft, said first control element being formed by said first sleeve;
  a second sleeve fixed nonrotatably to the input part, said second control element being formed by said second sleeve; and
  a pair of blocking elements which prevent the wrap spring from being installed in an axially reversed position, said blocking elements being provided on respective said axial projections, wherein each of said sleeves comprises an essentially cylindrical base part, an axial projection extending from the base part, and a circumferential edge on the axial projection, said first and second control elements being formed on respective circumferential edges.

16. The actuating drive of claim 15, wherein said first and second actuating areas are provided on the same end of the wrap spring, said drive torque and said restoring torque acting in opposite directions.

* * * * *

UNITED STATES PATENT AND TRADEMARK OFFICE
CERTIFICATE OF CORRECTION

PATENT NO. : 7,191,886 B2 Page 1 of 1
APPLICATION NO. : 10/998371
DATED : March 20, 2007
INVENTOR(S) : Martin Flückiger It is certified that error appears in the above-identified patent and that said Letters Patent is hereby corrected as shown below:

Please replace the listing of inventors on the title page of the patent with the following:

[75]   Inventors:    Martin Flückiger, Schweinfurt (DE):

Thomas Walter, Kolitzheim (DE);

Matthias Müller, Röthlein (DE);

Peter Fenn, Waigolshausen (DE)

Signed and Sealed this

Nineteenth Day of June, 2007

JON W. DUDAS
*Director of the United States Patent and Trademark Office*